Patented Nov. 21, 1944

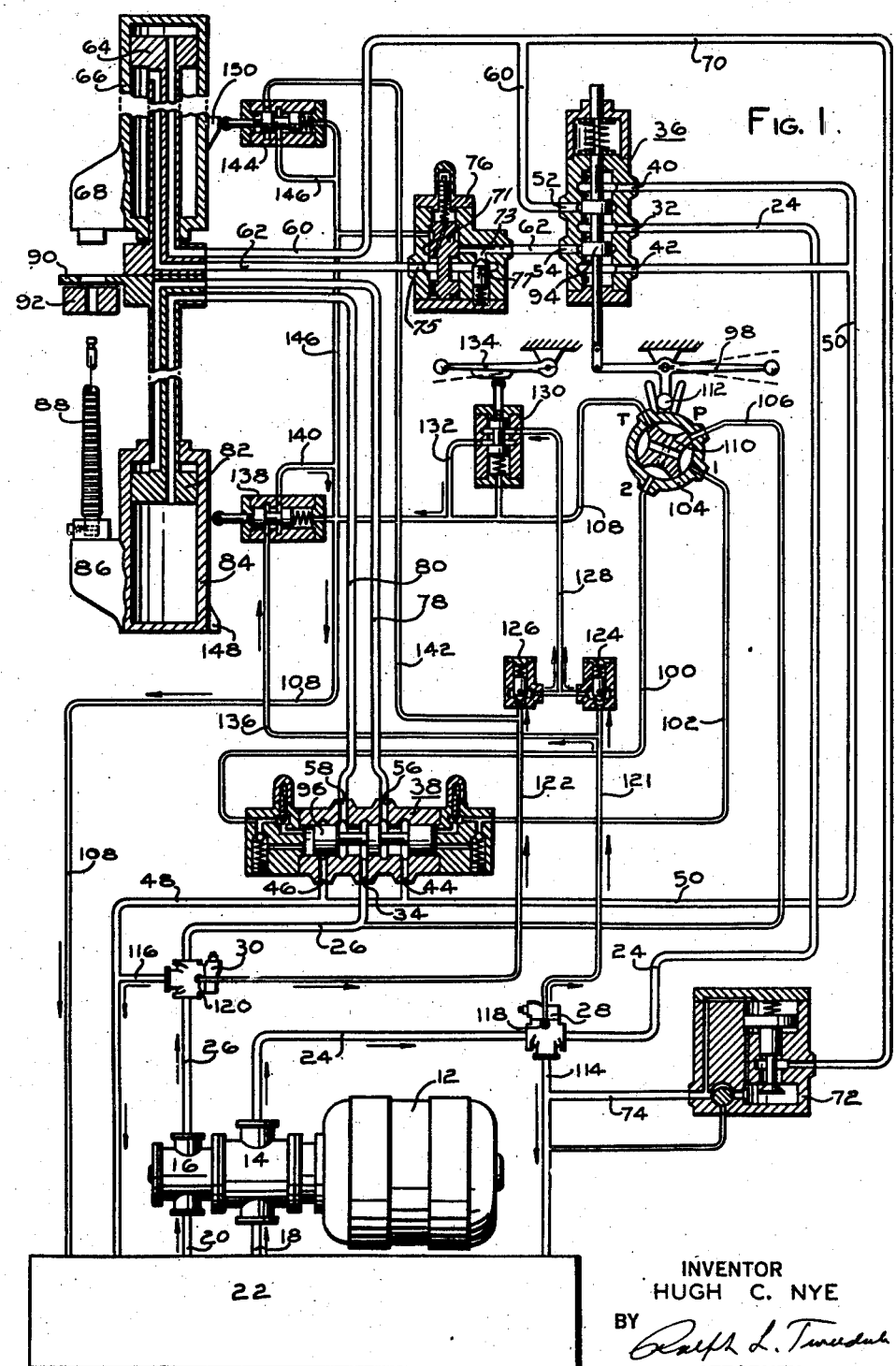

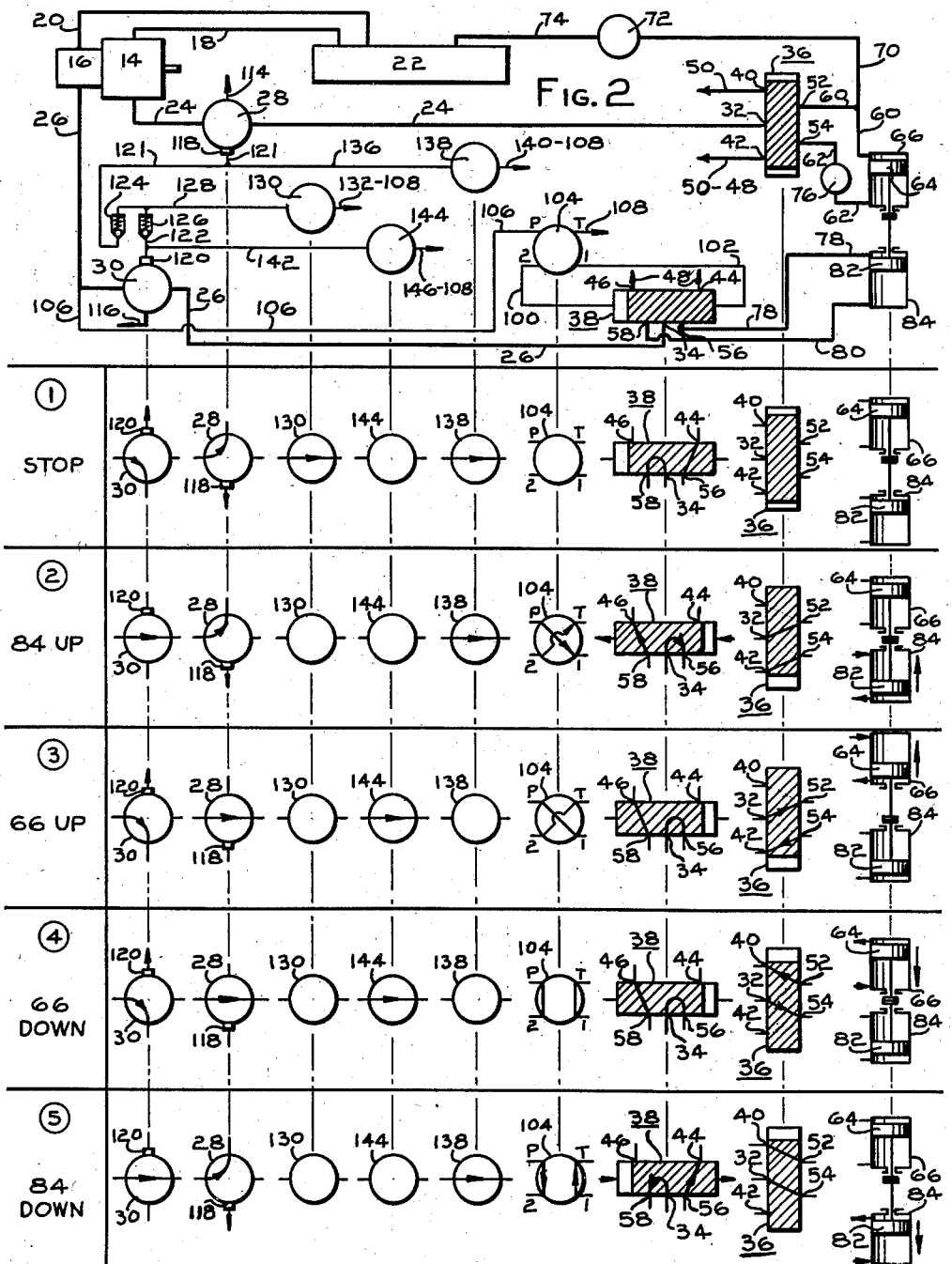

2,363,196

UNITED STATES PATENT OFFICE 2,363,196

POWER TRANSMISSION

Hugh C. Nye, Detroit, Mich., assignor to Vickers Incorporated, Detroit, Mich., a corporation of Michigan Application March 8, 1940, Serial No. 322,963

8 Claims. (Cl. 60—52)

This invention relates to power transmissions, particularly to those of the type comprising two or more fluid pressure energy translating devices one of which may function as a pump and another as a fluid motor.

The invention is more particularly concerned with a power transmission system for operating a plurality of fluid motors in sequence where it is desired to control the movement of one motor from the movement of another motor. Many types of machine tools utilize two or more piston and cylinder or other type of motors for actuating the slides of the machine, and it is frequently desirable to start the movement of one slide when another slide has reached a predetermined position.

It is an object of the present invention to provide an improved power transmission system for operating a plurality of fluid motors in sequence.

A further object is to provide in a system of this character improved control mechanism for this purpose including pump unloading means arranged for pilot control together with pilot valves of the venting type arranged to selectively determine the loaded or unloaded condition of the pump or pumps.

Further objects and advantages of the present invention will be apparent from the following description, reference being had to the accompanying drawings wherein a preferred form of the present invention is clearly shown.

In the drawings:

Figure 1 is a diagrammatic view of a hydraulic power transmission system incorporating a preferred form of the present invention.

Figure 2 is a circuit diagram of the mechanism of Figure 1 together with a chart of the flow conditions through the various valves in each stage of a cycle of operation.

Referring now to Figure 1, there is illustrated a prime mover, such as an electric motor 12, which is adapted to drive a pair of pumps 14 and 16. Suction conduits 18 and 20 connect between the pump inlets and a tank 22. Each of the pumps has a delivery conduit 24 and 26, respectively, which lead through combined relief and unloading valves 28 and 30 to the pressure ports 32 and 34 of conventional four-way, directional-control valves 36 and 38. Valve 36, as shown, is of the spring-centered, lever-operated type while valve 38 is of the pilot-operated type without the spring-centering feature.

The valves 36 and 38 may have tank ports 40, 42, 44 and 46 which are connected to tank by conduits 48 and 50. These valves also have motor ports 52, 54, 56 and 58, respectively, adapted each to be selectively connected to the pressure port while the other is connected to a tank port. The ports 52 and 54 connect by conduits 60 and 62, respectively, with the head and rod sides of a stationary piston 64, the latter carrying slidably mounted thereon a moving cylinder 66 carrying a pull head 68 and forming the main slide, for example, of a pull-up broach. Suitable automatic tool coupling means are provided at the pull head for engaging a broaching tool in the manner well understood in the art.

A branch conduit 70 extends from the conduit 60 to a hydrostatic flow-controlling valve 72 of well-known construction which serves to bypass fluid at a predetermined rate to the tank through a conduit 74. The conduit 62 may have incorporated therein a back pressure valve 76, also of well-known construction, for the purpose of preventing jerky upward movement of the cylinder 66 while permitting free flow into the rod end of the cylinder for downward movement. Briefly the valve comprises a spool 71 spring biased downwardly to cut off port 73 from port 75. The upper end of the spool is smaller than the lower end, and both ends are exposed to pressure in port 75 so that the differential area at the bottom overcomes the spring and opens the valve when the pressure in port 75 exceeds the spring setting. A check valve 77 is connected between ports 73 and 75 to permit free flow from port 73 to port 75 but to block flow in the opposite direction.

Ports 56 and 58 of valve 38 connect by conduits 78 and 80 with the rod and head sides, respectively, of a stationary piston 82. The latter carries slidably mounted thereon a movable cylinder 84 which carries a tool support 86 and may form the tool-handling cylinder of the broaching machine. A suitable broaching tool is indicated diagrammatically at 88 together with a work abutment 90 and a piece of work 92 positioned against the lower side thereof ready for broaching an internal hole therein.

The valves 36 and 38 may have slidable two-land and three-land spools 94 and 96, respectively, for shifting the connections between the various valve ports in the well-known manner. The spool 94 may be shifted by means of a manually-operable lever 98 while the spool 96 may be shifted by the admission of pilot pressure to one or the other of the operating chambers at either end of the valve. These chambers are connected by conduits 100 and 102 to the ports 2 and 1 of a rotary, four-way, pilot valve 104. A pressure port P of the latter connects by a conduit 106 with the supply conduit 26 from the pump 16 while the tank port T is connected to tank by a conduit 108. The rotary plug 110 of the valve 104 is adapted to be shifted concurrently with the shifting of spool 94 by means of a lever and fork connection 112 to the lever 98.

The combined unloading and relief valves 28 and 30 are similar to each other and may be constructed as shown in the patent to Harry F. Vickers, No. 2,043,453. Valves of this character are provided with a control chamber designated 12 in said patent which is in restricted communication with the pump supply line and, when exhausted to tank, permits the main valve to open, thus bypassing the pump discharge to tank through the bypass conduits 114 and 116 in the present example. An integral pilot relief valve is provided as disclosed in the aforesaid patent for venting the control chamber whenever the pressure therein rises beyond a predetermined value. In addition a connection to such control chamber, designated 118 and 120 in the present instance, is provided.

Pilot conduits 121 and 122 extend from connections 118 and 120 to check valves 124 and 126, respectively. From the outlet of the two check valves a conduit 128 extends to a pilot-venting valve 130 adapted to open or close communication between conduit 128 and a tank conduit 132 which connects to the conduit 108. The valve 130 is normally biased to open position and may be closed by operation of a lever 134 forming a manual means for closing the vent conduit 128 and constituting with the lever 98 a two-hand safety control for operation of the broaching machine.

An additional vent path is provided for the valve 28 and comprises a conduit 136 connected to the conduit 121 ahead of check valve 124 and extending to a pilot-venting valve 138 similar to the valve 130. The latter has a discharge conduit 140 connected to the conduit 108. Similarly, an additional venting path is provided for the valve 30 and constitutes a conduit 142 connected to the conduit 122 ahead of the check valve 126 and extending to a pilot-venting valve 144 also similar to the valve 130. The discharge from valve 144 is carried away by a conduit 146 extending to the conduit 108.

The valve 138 is arranged to be closed by a cam 148 carried by the cylinder 84 and arranged to contact the stem of valve 138 when the cylinder has reached a predetermined point in its upward movement. Similarly the valve 144 is arranged to be closed by a cam 150 which contacts the operating stem of valve 144 when the cylinder 66 has reached the lower end of its stroke.

In operation, with the motor 12 driving the pumps 14 and 16, the delivery of both pumps is bypassed to tank by the unloading valves 28 and 30, so long as the lever 134 is not manually depressed. This is the normal at-rest position of the mechanism and is illustrated in Figure 1 and in the first line of the table of Figure 2. The spool 96 of the valve 38 will have been shifted to its righthand position, as shown, during a previous cycle and will remain in that position until the lever 98 is shifted downwardly.

If now the levers 98 and 134 are both depressed, a cycle of upward movement will be started and the initial flow conditions which occur are illustrated in the second line of Figure 2. Depressing lever 134 closes the vent path through valve 130, and since valve 144 is closed by the cam 150, there is no vent path for the valve 30. The latter accordingly closes forcing all of the discharge of pump 16 to pass to the pressure port 34 of valve 38. When lever 134 operates valve 130 to cut off the vent for line 122 to thus cause valve 30 to close, port 34 is connected to port 58 and pressure building up in line 26 will be transmitted through such ports into line 80 until valve 96 is shifted to the left by pressure through 106, P, 1, and 102. However, as cylinder 84 is at its lowered position no movement of cylinder 84 occurs due to such connection. The closure of valve 130, however, could not load the pump 14 for the reason that the valve 138 is open providing a vent path through conduits 121, 136, 140 and 108 to tank. Thus the pump 14 remains unloaded. It will be noted that the check valve 124 prevents back flow of pressure oil from the discharge side of check valve 126 to the tank through conduit 136 and valve 138.

The downward shifting of lever 98 shifted the spool 94 upwardly and shifted the rotary plug 110 counterclockwise. The former established connections for pressure oil to pass from port 32 to port 52 and for return oil to pass from port 54 to port 42, but since pump 14 remains unloaded no flow occurs at this time. Shifting of valve 104 admitted pilot pressure from port P to port 1 and the righthand operating chamber of valve 38, thus shifting the spool 96 to the left. The oil discharged from the lefthand end is permitted to return to tank through conduit 100, ports 2 and T of valve 104 and conduit 108.

Shifting of spool 96 to the left admitted pressure oil from port 34 to port 56 where it flows through conduit 78 to the rod end of cylinder 84 thus causing the latter to move upwardly carrying the pilot of tool 88 through the work and work abutment until it contacts with and is automatically coupled to the pulling head 68. Oil discharged from the head end of cylinder 84 returns to tank through conduit 80, ports 58 and 46, and conduit 48.

As the cylinder 84 reaches the end of its stroke the cam 148 depresses the operating stem of valve 138 to close the latter thus cutting off the only vent path for valve 28. The pump 14 accordingly becomes loaded, and pressure oil now flows through conduit 24, ports 32 and 52 and conduit 60 to the head end of cylinder 66. The latter starts upwardly, and cam 150 rides off from the stem of valve 144 thus opening a vent path for valve 30 through conduits 122 and 142, valve 144 and conduits 146 and 108 to tank. Valve 30 accordingly opens unloading the pump 16 which was momentarily pumping against full relief valve pressure due to the stalling of cylinder 84 at the end of its stroke. The flow conditions at this time are shown in the third line of the table in Figure 2. The cylinder 66 continues upwardly, discharging oil from the rod end through conduit 62, foot valve 76, ports 54 and 42 of valve 36, and conduit 50 to tank.

During this stroke the broaching tool 88 is pulled through the work piece 92 to perform the broaching work. When the stroke is completed the operator may release the levers 98 and 134 to stop the machine and remove the work piece 92. When this is done the lever 134 may be again depressed and the lever 98 shifted upwardly to reverse the connection at the valves 36, 104 and, later on, at valve 38. The flow conditions at this time are illustrated in the fourth line of Figure 2.

It will be noted that the pump 16 remains unloaded due to the cam 150 being out of contact with valve 144 so that valve 38 remains at the left and cylinder 84 remains up. Pump 14, however, is loaded due to the cam 148 being in contact with valve 138. Accordingly, the cylinder 66 moves downwardly under the flow of pressure oil directed to the rod end thereof, and when this movement is completed, the cam 150 will contact the valve 144 thus closing the vent path for valve 30 and loading the pump 16 as shown by the last line of the table in Figure 2. Accordingly, pressure oil will be directed first through conduit 106, valve 104 and conduit 100 to shift valve 38 to the right and then to the head end of cylinder 84 causing the latter to move downwardly. As soon as it starts downwardly the cam 148 rides off from the valve 138 thus venting the valve 28 and unloading the pump 14 which was previously momentarily pumping against full relief valve pressure due to the stalling of cylinder 66 at the lower end of its stroke. When the cylinder 84 has reached the end of its downward stroke, the levers 98 and 134 may be released thus bringing the machine to rest in the stop position previously described.

While the form of embodiment of the invention as herein disclosed constitutes a preferred form, it is to be understood that other forms might be adopted, all coming within the scope of the claims which follow.

What is claimed is as follows:

1. In a hydraulic power transmission system having a plurality of fluid motors, a plurality of pumps and separate connections for supplying fluid from each pump to each of said motors, respectively, individual pilot-operated means for unloading each pump, and a pilot valve controlled by movement of one motor to a predetermined position for controlling the unloading means of a pump supplying fluid to another motor.

2. In a hydraulic power transmission system having a plurality of fluid motors, a plurality of pumps and separate connections for supplying fluid from each pump to each of said motors, respectively, directional control valve means for selectively reversing the flow to each motor, individual pilot-operated means for unloading each pump, a pilot valve controlled by movement of one motor to a predetermined position for controlling the unloading means of a pump supplying fluid to another motor, and a separate manually-operable pilot valve in circuit with the first pilot valve to effect unloading of the last-mentioned pump independently of said first pilot valve.

3. In a hydraulic power transmission system having a plurality of fluid motors, a plurality of pumps and separate connections for supplying fluid from each pump to each of said motors, respectively, individual valves for unloading each pump, each valve having a control chamber in restricted communication with the pump delivery, and a pilot valve controlled by movement of one motor to a predetermined position for venting the control chamber of the unloading valve of a pump supplying fluid to another motor to unload said pump.

4. In a hydraulic power transmission system having a plurality of fluid motors, a plurality of pumps and separate connections for supplying fluid from each pump to each of said motors, respectively, directional control valve means for selectively reversing the flow to each motor, individual valves for unloading each pump, each valve having a control chamber in restricted communication with the pump delivery, a pilot valve controlled by movement of one motor to a predetermined position for venting the control chamber of the unloading valve of a pump supplying fluid to another motor to unload said pump, and a separate manually-operable pilot valve in circuit with the first pilot valve to effect unloading of the last-mentioned pump independently of said first pilot valve.

5. In a hydraulic power transmission system having a pair of fluid motors, a pair of pumps and separate connections for supplying fluid from each pump to each of said motors, respectively, individual valves for unloading each pump, each valve having a control chamber in restricted communication with the pump delivery, a pilot valve controlled by movement of each motor to a predetermined position for venting the control chamber of the unloading valve of the pump supplying fluid to the other motor to unload said pump, and a single additional pilot valve connected to both control chambers to effect simultaneous venting thereof.

6. In a hydraulic power transmission system having a pair of fluid motors, a pair of pumps and separate connections for supplying fluid from each pump to each of said motors, respectively, individual valves for unloading each pump, each valve having a control chamber in restricted communication with the pump delivery, a pilot valve controlled by movement of each motor to a predetermined position for venting the control chamber of the unloading valve of the pump supplying fluid to the other motor to unload said pump, and a single additional pilot valve connected by check valves to both control chambers to effect simultaneous venting thereof.

7. In a hydraulic power transmission system having a pair of fluid motors, a pair of pumps and separate connections for supplying fluid from each pump to each of said motors, respectively, individual valves for unloading each pump, each valve having a control chamber in restricted communication with the pump delivery, a pair of separate pilot valves each connected to vent the control chamber of a respective unloading valve, and a separate pilot valve connected to both control chambers to simultaneously unload both pumps.

8. In a hydraulic power transmission system having a plurality of fluid motors, a plurality of pumps and separate connections for supplying fluid from each pump to each of said motors, respectively, individual valves for unloading each pump, each valve having a control chamber in restricted communication with the pump delivery, and pilot valve means having connections to vent the control chambers of each unloading valve separately or jointly for selectively unloading any one of the pumps or more than one pump, respectively.

HUGH C. NYE.